United States Patent [19]
Bauer

[11] 3,731,711
[45] May 8, 1973

[54] CORRUGATED CONDUIT

[76] Inventor: William J. Bauer, 422 South Park, La Grange, Ill. 60525

[22] Filed: Dec. 17, 1968

[21] Appl. No.: 784,355

[52] U.S. Cl. .................138/178, 138/121, 138/173, 137/1
[51] Int. Cl.............F16l 9/02, F16l 9/06, F17d 1/00
[58] Field of Search......................138/177, 173, 178, 138/121, 150, 153, 154; 285/333; 137/1

[56] References Cited

UNITED STATES PATENTS

| 365,454 | 6/1887 | Westinghouse, Jr. .....................137/1 |
| 3,311,120 | 3/1967 | Palmisano ...............................137/1 |
| 720,418 | 2/1903 | Gearing...............................138/173 |
| 863,695 | 8/1907 | Breckenridge ..................138/173 X |
| 2,309,685 | 2/1943 | Westwood......................138/173 X |
| 1,259,233 | 3/1918 | Hartman.......................138/177 X |
| 1,926,628 | 9/1933 | Morehouse......................138/177 X |
| 3,212,222 | 10/1965 | Wittfoht.............................138/173 X |

FOREIGN PATENTS OR APPLICATIONS

| 17,733 | 1896 | Great Britain........................138/173 |
| 7,766 | 1888 | Great Britain........................138/173 |
| 20,940 | 1894 | Great Britain........................138/173 |
| 21,926 | 1892 | Great Britain........................138/173 |
| 22,099 | 1891 | Great Britain........................138/173 |

*Primary Examiner*—James Kee Chi
*Attorney*—Pendleton, Neuman, Williams & Anderson

[57] ABSTRACT

Corrugated metal conduit is provided with inwardly projecting corrugations having smoothly arcuate broad inner crest surfaces which are substantially broader than the intervening trough bottoms and which are inclined shallowly outward at each edge whereby the fluid flow conforms thereto and the eddy volume in the troughs is minimized to increase the flow efficiency of the conduit. Further, inwardly extending projections may be provided on the crests to generate vortices to assist in delaying the departure of the flow from the crest surfaces.

11 Claims, 15 Drawing Figures

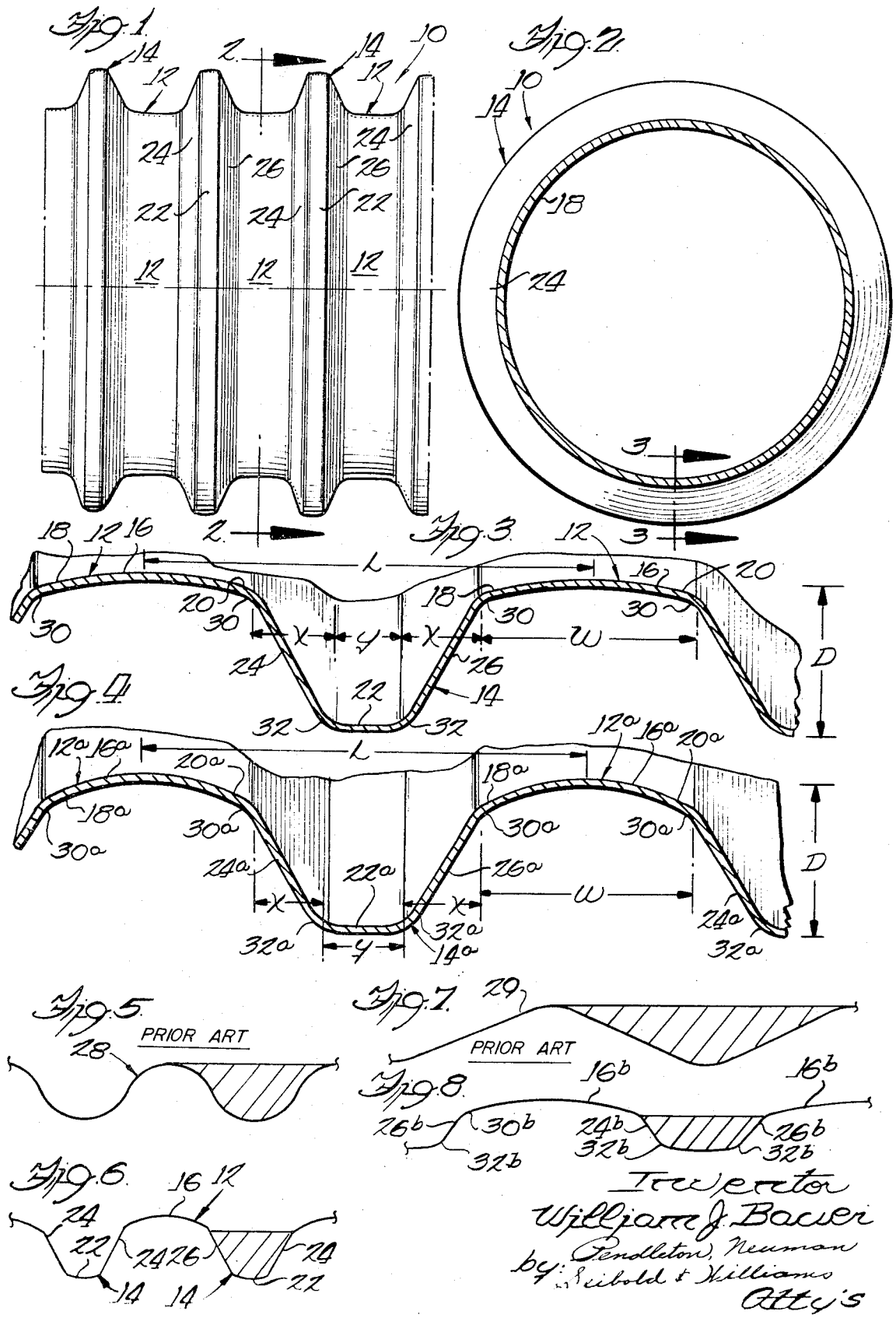

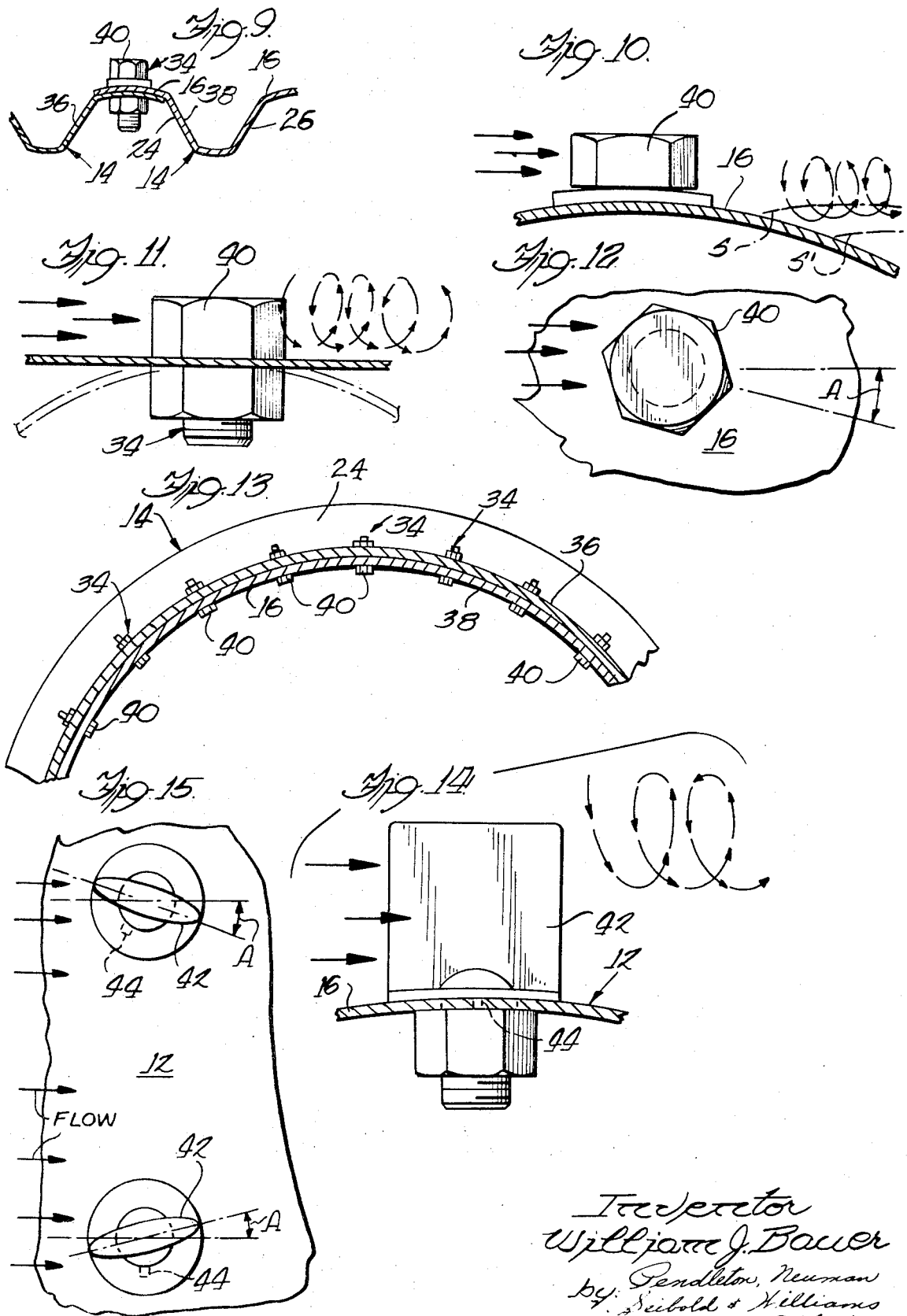

CORRUGATED CONDUIT

This invention pertains to improvements in corrugated conduits and more particularly pertains to improving the flow efficiency of corrugated metal conduits by providing improvements which reduce the frictional resistance to flow of fluids, such as water and air, through such conduit.

Corrugated conduits such as corrugated metal pipes and large conduits have long been known and are widely utilized. Two typical or traditional designs utilize so-called 2 × 6 inches and ½ × 2-⅔ inches corrugations, wherein the first dimension indicates the crest-to-trough depth of the corrugations and the second dimension represents the period or the crest-to-crest length of the corrugations. The 2 × 6 inches design is more commonly utilized in larger diameter conduits which often are fabricated of curved corrugated plates bolted together in edge overlapping relation for forming conduits, such as electric generating station cooling-water intakes, large drainage conduits and the like. The ½ × 2-⅔ inches design is more commonly utilized for smaller conduits, which are often formed in sections each comprising a single curved corrugated sheet forming the complete circumference and having a single longitudinal joint at the overlapping edges. Such sections are overlapped and joined at transverse bolted joints to form long pipes or tubes.

The bolts utilized for forming overlap joints as aforenoted normally are located as necessary for structural purposes, and one end normally projects into the flow stream. The common assumption has been that these inward projections cause additional frictional resistance to flow of fluid through the conduit. For example, in one instance of laboratory tests performed by the U.S. Army Corps of Engineers and pertaining to large corrugated conduits, it was assumed that the inwardly projecting bolt heads increased the flow resistance, and the calculated increase in friction factor was on the order of 8 percent.

Conventional corrugated conduit designs have utilized symmetrical corrugation profiles, that is, the corrugation cross-sectional profiles are of a regular, reversing curvilinear design, such as a sine curve, wherein the land portions and the groove portions are of substantially the same configuration and dimensions, merely being reversed in sign or direction of deflection with respect to a median cylindrical surface. The friction factors for such corrugated conduit have been relatively greater than for smooth-wall conduits, for example, steel or concrete.

It is an object of this invention to provide improvements in corrugated conduits to substantially reduce the friction factors and to increase the flow coefficients thereof.

It is a more specific object of this invention to provide the foregoing improvements in corrugated metal conduits.

Further and additional objects and advantages of this invention will be apparent to those skilled in the art from the attached drawings and the following description and claims.

In accordance with the present invention, the friction factor of corrugated conduit, such as corrugated pipe, is substantially reduced. Several aspects of the improved conduit contribute to this result. The configuration of the corrugation profile substantially reduces the volume of the areas in which eddies occur, while maintaining the requisite structural strength of the conduit. Further, provision is made for the establishment, under flow conducting conditions, of vortices which infuse flow energy into at least a portion of the eddy areas, and thereby assist in further reducing the eddy volume.

In carrying out this invention in one illustrative form, a corrugated metal conduit is provided wherein the corrugations, in longitudinal cross section, have inwardly projecting lands with broad inner crest surfaces inclined shallowly outward at each end, with a maximum outward slope of between about 1:5 and about 1:1.75, the intervening grooves having side walls substantially steeper than the adjacent portions of the inner crests and bottoms each of a width substantially less than the width of said crests. Projection components of a configuration and orientation to generate substantial vortices in the flow stream project inwardly from the crests of said corrugations at appropriate circumferential and longitudinal spacings to generate vortices extending over substantially the entire inner surface of said conduit.

For a more complete understanding of this invention references should now be had to the embodiments illustrated in greater detail in the accompanying drawings and described below by way of example of the invention.

In the drawings:

FIG. 1 is a side elevation view of a section of a corrugated metal conduit employing teachings of this invention;

FIG. 2 is a cross-sectional view taken along line 2—2 of FIG. 1 and looking in the direction of the arrows;

FIG. 3 is a partial cross-sectional view taken along line 3—3 of FIG. 2 and looking in the direction of the arrows;

FIG. 4 is a view similar to FIG. 3 and showing another corrugation profile employing teachings of the invention;

FIG. 5 is a schematic representation of the corrugation profile of a conventional corrugated conduit and depicting the eddy area thereof;

FIG. 6 is a schematic representation of the corrugation profile of the conduit of FIG. 1 on the same scale as FIG. 5, and depicting the eddy area thereof;

FIGS. 7 and 8 are schematic representations similar to FIGS. 5 and 6, with FIG. 7 illustrating another conventional corrugation design and FIG. 8 illustrating another embodiment employing teachings of this invention;

FIG. 9 is a cross-sectional view on a reduced scale, of a transverse overlap joint between sections of a conduit as in FIG. 1;

FIGS. 10 and 11 are partial schematic views illustrating the operation of the present invention;

FIG. 12 is an enlarged plan view of a bolt head disposed in accordance with this invention;

FIG. 13 is an enlarged partial transverse cross-sectional view of an overlapping transverse joint between sections of a conduit as in FIG. 1;

FIG. 14 is a side elevation view of a modified projection member installed on a conduit, and FIG. 15 is a plan view of a pair of circumferentially adjacent members of the type shown in FIG. 14.

Referring to FIGS. 1-3, a corrugated conduit 10 is formed with corrugations comprising, in profile, inwardly projecting lobes 12 and outwardly projecting lobes 14. For convenience, the inwardly projecting lobes 12 will hereinafter sometimes be referred to as the lands or peaks, and the outwardly projecting lobes 14 will sometimes be referred to as the grooves, troughs or valleys.

As will be observed, the lands 12 are of a substantially greater longitudinal dimension than the grooves, i.e., being broader in the direction of flow than the troughs. Each land has a broad inner crest 16 which is gently and smoothly curved outwardly at each end 18 and 20, and each groove 14 has a relatively narrow bottom section 22. The successive crests and bottom sections are joined by side walls 24 and 26 which are substantially planar in cross-section, see FIG. 3. It will be appreciated that each of these walls is of a truncated conical configuration, see FIG. 1.

The configuration of the crests 16 and the proportions of the corrugation profile are important aspects of the present invention. Referring to FIGS. 5 and 6, the cross-sectional areas of two different corrugations subject to eddy currents upon flow of fluid thereover are indicated by the shaded areas. FIG. 5 represents a conventional symmetrical corrugation 28 and FIG. 6 represents a corrugation as in the conduit of FIG. 1. It will be observed that the eddy area or volume of the profile of FIG. 6 is substantially reduced as compared to that of FIG. 5.

In order to reduce the eddy volume to improve the flow characteristics of the conduit, while retaining the desirable structural strength of a corrugated conduit, several factors must be considered. Referring again to FIG. 3, the crests 16 should be of a width $W$ as large as possible relative to the period dimension $L$ and thus relative to the width of the grooves ($2X+Y$) as this directly affects the total eddy volume. However, along with this must be considered, more particularly, the effective width of the crests of the lands, that is, the width of the crests to which the main flow stream will conform before separating or departing therefrom to flow across the adjacent downstream trough to the next crest. The crests should be of a gently and smoothly curved configuration to insure that the stream will conform thereto over as great an axial distance as possible.

It will also be appreciated that another significant determinant of the eddy volume in a corrugation of a given depth ($D$ in FIG. 3) is the depth (measured radially of the conduit) of each eddy area. While linear adherance of the flow stream to the crest could be optimized by a very shallowly curved, or a flat crested corrugation, the eddy volume is further reduced by having the adherent crest area extend radially outward into the trough as far as possible. Accordingly, the configuration of the crests should not only insure conformance of the flow stream thereto over a maximum distance measured parallel to the axis of the conduit, but should also insure conformance of the flow stream as far outward into the following trough as possible. These parameters may be stated primarily in terms of the effective axial length of each crest and the curvature or maximum inclination of the crests to the axis of the conduit. With greater crest length, greater reduction of radial depth of the eddy areas can be obtained with less inclination of the crests. To provide significant reduction in depth of the eddy area and to obtain good flow characteristics, the crests should have end areas of maximum inclination to the conduit axis of between 1:5 and 1:1.75.

A further factor which may assist in obtaining the desired conformance of the flowing fluid with the inner crest surfaces is the surface texture of the surface or boundary in contact with the fluid. By providing surface textures of adequate roughness whereby surface irregularities project through the laminar flow sublayer at the flow boundary, boundary turbulence is generated which infuses added energy from the flow stream into the low velocity zone near the boundary. In somewhat the same manner described below with respect to structural internal projections, this energy infusion permits the ultimate deceleration and reversal of flow to take place further downstream on the crests than would be the case with a smooth outer surface. Accordingly, with appropriate rough crest surfaces the flow stream will conform to the inner crest surfaces over a greater distance and the departure point may be displaced further outward into the grooves, whereby additional reduction of the eddy volume may be obtained. The above-noted effect will normally be obtained in some degree with surface texture projections of over about 1/1000 inch, and may be obtained from the normal surface roughness of materials such as hot-dip galvanized steel or hot rolled steel. This effect will increase with increased roughness or extent of the projections from the surface.

The minimum width of the troughs, and hence the maximum relative width of the crests, as well as the depth of the corrugation are affected by structural and fabrication requirements. The overall corrugation depth $D$, the width $Y$ of the bottom section 22 and dimension $X$, or the angle of each side wall, must be sufficient to achieve adequate structural strength in the circumferential direction, i.e., the arch action or resistance of the conduit to collapse under lateral compressive stress. The width $Y$ of bottom section 22 and the dimension $X$ for each side wall 24 and 26 also should be adequate to permit convenient formation of the conduit walls, as by rolling. Further, it may be desirable to provide joints between sections at the bottoms of the troughs in some installations. Accordingly, the bottom sections 22 should be of adequate width to accommodate bolts and washers, welding, rivets, or the like.

The angle of walls 24 and 26 to the axis of the conduit should be maximized insofar as practical, within other requirements, such as those aforenoted, to minimize dimension $X$. However, the beam strength of the assembled pipe in the direction of the axis of the pipe is greatly dependent on the inclination of these sides of the troughs. As the straight sides forming the walls 24 and 26 become more vertical, i.e., approach radii of the conduit, greater bending moments result from longitudinal forces. Thus, the ease with which the corrugations would "accordian" and the conduit collapse becomes increased as the angle of the side walls to the conduit axis increase.

By way of a more particular illustration, the embodiment 10 is assumed to represent a 2 × 6 inches corrugation galvanized steel conduit. That is, the period of the corrugation profile indicated by dimension $L$ is 6 inches and the depth $D$ is 2 inches. Each crest 16 is of a length W which is equal to $L/2$, or 3 inches, and is of radius of curvature of 6 inches, with a maximum inclination to the conduit axis of about 1:3.9 (14.5°). Dimension $Y$ is 0.6 inch or $L/10$, and each dimension $X$ is 0.9 inch, or about $L/6.7$, with walls 24 and 26 each at an angle of about 63° to the conduit axis.

FIG. 4 represents another embodiment wherein like elements are identified by the same numbers as in FIGS. 1–3, with the subscript $a$. This profile is the same as that of FIG. 3 except that the radius of curvature of crests 16a is 3 inches, whereby the maximum angle of inclination of the crests is about 1:1.75 (30°). Accordingly, the troughs are slightly shallower than in FIG. 3 (1.62 inches as compared to 1.85 inches from the ends of the crests to the bottom sections), and the angle of inclination of walls 24a and 26a is about 58°.

FIG. 8 illustrates a corrugation profile 29 of ½ × 2-⅔ inches according to this invention, as compared to a conventional ½ × 2-⅔ inches corrugation profile in FIG. 7. Utilizing the nomenclature as above with respect to FIG. 3 and designating similar components with the same numeral and the subscript $b$, the embodiment of FIG. 8 has dimensions of $L = 2.67$ inches, $D = 0.5$ inch, $W = 1.67$ inches, radius of curvature of crests 16b = 3 inches, and total trough width = 1 inch with $Y$ = about 0.64 inch and $X$ = about 0.18 inch. The side walls 24b and 26b may include short straight segments joining an arcuate bottom section as illustrated. In this embodiment the bottom section 22b also is of a radius of curvature of 3 inches, and the side walls 24b and 26b have a maximum angle of inclination of about 55°. The cross-sectional area of the eddy volume in the embodiment of FIG. 8 is about ¼ sq. in., as compared to about ⅔ sq. in. in the embodiment of FIG. 7, or a ratio of 3:8.

While simple circular curves have been described for the exposed surfaces of crests 12, these surfaces also may be of other curvilinear forms in profile. For instance, these inner surfaces may be of the general form of the upper surface of an airfoil, with the leading edge oriented upstream. However, symmetrical cross-sections are more convenient when joining adjacent sections, and circular sections therefore are preferred. Also, by providing bottom sections 22 of the same curvature as crests 16 as in FIGS. 3, 4 and 8, washers and the like of the same configuration may be utilized for lap joints whether they occur at the crests or in the troughs.

In each embodiment, the radii of curvature at the junctions between the various profile sections, e.g. at 30, 30a, 30b, 32, 32a and 32b, is selected primarily upon the basis of structural requirements and fabrication convenience, a typical radius being on the order of ½inches.

By way of summary, the components of the above-described corrugations may be described as comprising broad inner crest curves 16 comprising about 50 percent or more of the inner surface of the conduit as projected onto a cylindrical surface tangent to the innermost crest surfaces, inclined surfaces 24 and 26 forming the sides of the troughs between crests 16, outer crest curves 22 forming the bottoms of the troughs and having the same curvature as crests 16, and curve portions 30 and 32 of relatively small radius forming the transitions between the crests 16 and the side walls 24 and 26 and between these side walls and the trough bottoms 22. While the curvature of the crests 16 is circular as illustrated, it may be of other configurations, such for example as parabolic.

FIGS. 9 and 13 illustrate the use of bolts 34 for joining overlapping edges of adjacent sections 36 and 38 of conduit wall along a transverse joint. The heads 40 of these bolts project inwardly from the crests 12, into the flow stream. Heretofore it has been assumed that such projections provided substantial resistance to flow of fluid through the conduit. However, such projections may enhance the flow characteristics of the conduit. Such enhancement is based upon the hydraulic flow principle that the velocity of flow of a fluid in contact with a boundary is always zero, and the fluid motion with respect to the boundary may have increasing velocities as the distance from the boundary is increased.

When fluid moves from a location with a smaller cross-sectional area to one with a larger cross-sectional area, such as moving from the crest to the trough of a corrugation in a corrugated metal pipe, the flow as a whole tends to decelerate in accordance with the law of continuity in order to pass through the larger cross-section at lesser average velocity. However, the velocity of the fluid at the boundary is already zero in accordance with the concept of the boundary layer. Hence, the fluid in the vicinity of the boundary, in order to decelerate in conformity to the law of continuity, must move upstream. Thus there occurs the separation of the flow into the main body moving in the main direction of the flow, and one or more eddies in which a portion of the fluid is actually moving in the direction opposite to the direction of the main body of the flow. This happens in the trough of a corrugated metal pipe.

Each bolt head of whatever shape it may be will generate a wake of turbulent flow as illustrated in FIG. 11. If the head projecting from a wall is of an appropriate shape and/or orientation, for instance as shown in FIG. 12, there is set up in addition a spiral motion or vortex downstream from the projection. This vortex superimposed on the motion of fluid translation along the conduit results in the spiral type of flow indicated in FIG. 10. This spiral flow then is able to carry fluid with a higher velocity down into the boundary layer, thereby accomplishing the elimination or delay of separation of the flow stream from the subjacent crest and attendant reduction of the eddy volume, which is desired, while also stabilizing the point of separation. Such delay of separation and attendant reduction of eddy volume is indicated schematically in FIG. 10 by the displacement of separation plane S' from a "normal" separation plane S.

Polygonal projections, such as ordinary bolt heads, positioned at a predetermined uniform angle to the direction of flow may be utilized to enhance the hydraulic characteristics of the flow passage. Apparently this is due to the formation of two counter-rotating vortices downstream of each such projection which tend to dissipate one another. However, by uniformly canting such projections at an appropriate angle A (FIG. 12), for example about 10°, one vortex from each projection will be strengthened in preference to the other, and the dominant vortex will persist for a significant distance downstream. Thus bolts which may also serve assembly purposes may be used to enhance the flow in accordance herewith.

The aforementioned vortex action may be enhanced by utilizing projections of special design. In particular, the projections 42 illustrated in FIG. 14 and FIG. 15 are relatively narrow in width, being of a streamlined, elongated oval configuration in cross-section, and resemble airfoils. These components may be on the order of ½ inch or more in length (normal to the conduit wall) and of approximately the same chord length. Such a design has a high lift-drag coefficient and a low aspect ratio (ratio of projecting length to airfoil length) to produce a strong vortex with little resistance to flow of the fluid.

The vortex phenomenon will be further enhanced by disposing adjacent projections, i.e. adjacent to one another transversely of the conduit, at opposite angles relative to the conduit axis, see FIG. 15. Thereby, alternate vortices are counterrotating whereby they complement one another for greater persistence. Accurate positioning of the projections may be obtained by providing an indexing projection 44 on each mounting bolt, with a mating slot or notch appropriately positioned along the periphery of each receiving hole in the conduit walls, see FIG. 15.

The appropriate spacing between projections to obtain optimum flow efficiency will vary with the particular installation and flow conditions. Too many projections will only add the individual drag of each projection and not be any more effective in preventing or delaying separation of the flow from the crests than would a lesser number of projections strategically placed. By way of example, such projections may be spaced about 3 head dimensions circumferentially of the conduit (see FIGS. 13 and 15) on crests spaced about 10 to 100 head dimensions axially of the conduit, or spaced about 6 inches apart circumferentially with circles of projections spaced as much as 4 to 8 feet axially of the conduit. The optimum spacing will depend in part upon the contributing surface roughness factor noted above and in part upon the shape of the corrugation profile, as well as upon flow factors such as viscosity and anticipated flow rates.

It will be obvious that modifications of the specific embodiments shown may be made within the teachings herein and without departing from the spirit and scope of this invention. For instance, while the basic corrugations of 2 × 6 inches and ½ × 2-⅝ inches have been referred to in keeping with prior convention, it will be appreciated that 1 × 3 inches corrugations, or corrugations of other overall dimensions may be utilized.

It will thus be seen that improved corrugated conduits have been provided wherein the line of separation of the flow from each crest will be delayed whereby the flow stream will conform to the corrugation profile a substantial distance down into each trough. The design of the corrugations facilitates this conformance and minimizes the eddy current volume in each trough. Further, the delay of separation or departure of the flow from each crest may be augmented significantly and stabilized by the energizing action of the vortex generating projections.

Accordingly, it will be appreciated that improvements have been provided in corrugated conduit which meet the aforestated objects.

While particular embodiments of this invention have been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

I claim:

1. Elongated conduit having a corrugated inner surface of uniform configuration throughout its length, said inner surface defining inwardly projecting lands with broad inner crest surfaces each curvilinear longitudinally of said conduit and each shallowly inclined radially outward at each longitudinal edge thereof for assuring conformance over each of said crest surfaces between the respective longitudinal edges of flow streams of fluid flowing longitudinally of such conduit, and intervening grooves joining adjacent crest surfaces, each of said grooves being defined by outwardly converging side walls and a bottom section, each of said side walls extending radially outward at an angle to the axis of said conduit which is substantially greater than the angle of inclination of the adjacent crest edge portion, said inner crest surfaces comprising at least about 50 percent of said inner surface of said conduit as measured parallel to the longitudinal axis of said conduit.

2. Corrugated metal conduit wherein the corrugations are of the configuration of said inner surface as defined in claim 1.

3. Conduit as in claim 1 wherein each edge of each of said inner crest surfaces has an outward inclination of at least about 1:5 with respect to the longitudinal axis of said conduit.

4. Conduit as in claim 1 wherein each edge of each of said inner crest surfaces has an outward inclination less then about 1:1.75 with respect to the longitudinal axis of said conduit.

5. Conduit as in claim 1 wherein each edge of each of said crest surfaces has an outward inclination of between about 1:5 and 1:1.75 with respect to the longitudinal axis of said conduit.

6. Conduit as in claim 1 wherein each edge portion of each of said crest surfaces extends radially outward relative to the innermost surface of the respective crest, a distance greater than about 10 percent of the crest-to-trough dimension of said inner surface.

7. Conduit as in claim 6 wherein each edge portion of each of said crest surfaces extends radially outward a distance between about 10 and 25 percent of such crest-to-trough dimension.

8. Conduit as in claim 1 wherein said inner crest surfaces and said bottom sections are smoothly arcuate and of the same curvature.

9. Elongated corrugated conduit having inwardly projecting lands with broad inner crest surfaces each of a smooth curvilinear configuration longitudinally of said conduit, each longitudinal edge of each of said surfaces crest being inclined radially outward at an outward inclination of between about 1:5 and 1:1.75 with respect to the longitudinal axis of said conduit, and intervening grooves joining adjacent crest surfaces, each of said grooves being defined by side walls which converge with one another radially outwardly and a bottom section, each of said side walls extending radially outward at an angle to said axis which is substantially greater than the angle of inclination of the adjacent crest edge portion, said inner crest surfaces comprising at least about 50 percent of the inner surface of said conduit as measured parallel to the longitudinal axis of said conduit.

10. A method for increasing the efficiency of flowing fluid through corrugated conduit comprising providing elongated conduit having a corrugated inner surface of uniform configuration throughout its length, said inner surface defining inwardly projecting lands with broad inner crest surfaces each curvilinear longitudinally of said conduit and each shallowly inclined radially outward at each longitudinal edge thereof, and intervening grooves joining adjacent crest surfaces, each of said grooves being defined by outwardly converging side walls and a bottom section, each of said side walls extending radially outward at an angle to the axis of said conduit which is substantially greater than the angle of inclination of the adjacent crest edge portion, said inner crest surfaces comprising at least about 50 percent of said inner surface of said conduit as measured parallel to the longitudinal axis of said conduit, and flowing fluid through said elongated conduit with the main flow stream conforming to each of said crest surfaces throughout the area of each such crest surface between the respective longitudinal edges thereof.

11. A method for increasing the efficiency of flowing fluid through corrugated conduit comprising providing elongated corrugated conduit having inwardly projecting lands with broad inner crest surfaces each of a smooth curvilinear configuration longitudinally of said conduit, each longitudinal edge of each of said inner crest surfaces being inclined radially outward at an outward inclination of between about 1:5 and 1:1.75 with respect to the longitudinal axis of said conduit, and intervening grooves joining adjacent crest surfaces, each of said grooves being defined by side walls which converge with one another radially outwardly and a bottom section, each of said side walls extending radially outward at an angle to said axis which is substantially greater than the angle of inclination of the adjacent crest edge portion, said inner crest surfaces comprising at least about 50 percent of the inner surface of said conduit as measured parallel to the longitudinal axis of said conduit, and flowing fluid through said elongated conduit with the main flow stream conforming to each of said crest surfaces throughout the area of each such crest surface between the respective longitudinal edges thereof.

* * * * *

UNITED STATES PATENT OFFICE
CERTIFICATE OF CORRECTION

Patent No. 3,731,711  Dated May 8, 1973

Inventor(s) William J. Bauer

It is certified that error appears in the above-identified patent and that said Letters Patent are hereby corrected as shown below:

Column 8, lines 4-5 (claim 9), "surfaces crest" should read -- inner crest surfaces --.

Signed and sealed this 27th day of November 1973.

(SEAL)
Attest:

EDWARD M. FLETCHER, JR.
Attesting Officer

RENE D. TEGTMEYER
Acting Commissioner of Patents